(12) United States Patent
Friedman et al.

(10) Patent No.: US 8,528,597 B2
(45) Date of Patent: *Sep. 10, 2013

(54) ACTUATOR AND VALVE ASSEMBLY

(75) Inventors: Mark William Friedman, Portage, MI (US); Robert Brian Knepple, Kalamazoo, MI (US)

(73) Assignee: Humphrey Products Company, Kalamazoo, MI (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/268,768

(22) Filed: Nov. 11, 2008

(65) Prior Publication Data

US 2009/0065721 A1 Mar. 12, 2009

Related U.S. Application Data

(62) Division of application No. 11/396,671, filed on Apr. 3, 2006, now Pat. No. 7,448,411.

(51) Int. Cl.
*F16K 11/07* (2006.01)
(52) U.S. Cl.
USPC ........................................ 137/625.48; 251/65
(58) Field of Classification Search
USPC ................ 137/625.48; 251/65; 60/527, 528; 335/1
See application file for complete search history.

(56) References Cited

U.S. PATENT DOCUMENTS

| | | | |
|---|---|---|---|
| 4,544,988 A | 10/1985 | Hochstein | |
| 4,887,430 A | 12/1989 | Kroll et al. | |
| 4,973,024 A | 11/1990 | Homma | |
| 5,144,813 A | 9/1992 | Orner et al. | |
| 5,211,371 A | 5/1993 | Coffee | |
| 5,306,979 A | 4/1994 | Schwarz, Jr. | |
| 6,133,816 A | 10/2000 | Barnes et al. | |
| 6,279,869 B1 | 8/2001 | Olewicz | |
| 6,404,098 B1 | 6/2002 | Kayama et al. | |
| 6,633,095 B1 | 10/2003 | Swope et al. | |
| 6,742,761 B2 | 6/2004 | Johnson et al. | |
| 6,843,465 B1 | 1/2005 | Scott | |
| 6,916,159 B2 | 7/2005 | Rush et al. | |
| 7,260,932 B1 | 8/2007 | Klimowicz | |
| 7,331,616 B2 | 2/2008 | Brei et al. | |
| 7,723,896 B2 * | 5/2010 | Esashi et al. | .............. 310/306 |

\* cited by examiner

*Primary Examiner* — John Fox

(74) *Attorney, Agent, or Firm* — Gardner, Linn, Burkhart & Flory, LLP

(57) ABSTRACT

An actuator for selectively moving a part relative to another part includes a shape memory wire, which contracts when heated. One portion of the shape memory wire is fixed to a first body, and another portion of the shape memory wire is coupled to a second body, which is movable relative to the first body. When heated the shape memory wire contracts and moves the second body in a direction of travel from a first position relative to the first body toward a second position. The actuator further includes a magnetic field for generating a magnetic force on the second body. The magnetic force acts on and moves the second body in the direction of travel to the second position after the shape memory wire initially contracts, and further decouples the second body from the shape memory wire when applying the magnetic force to the second body to thereby unload the load on the shape memory wire when the second body is moved to the second position.

19 Claims, 6 Drawing Sheets

ACTUATOR AND VALVE ASSEMBLY

CROSS-REFERENCE TO RELATED APPLICATIONS

This application is a divisional application of U.S. copending application Ser. No. 11/396,671, filed Apr. 3, 2006, entitled ACTUATOR AND VALVE ASSEMBLY by Applicants Mark William Friedman and Robert Brian Knepple, which is incorporated herein by reference in its entirety.

TECHNICAL FIELD AND BACKGROUND OF THE INVENTION

The present invention relates to an actuator and, more particularly, to an actuator that incorporates the use of shape memory wires and that is particularly suitable for use in a valve.

Shape memory wires or "muscle wires" contract when heated; however, when shape memory wires are subjected to constant or increasing loads during their contraction their strokes will be limited or their size will need to be increased in order to prevent the stresses in the wires from exceeding the wire failure stress. As a result, their use in certain applications has been limited.

Accordingly there is a need for an actuator that can take advantage of the properties of shape memory wires and yet avoid their inherent limitations.

SUMMARY

The present invention is directed to an improved actuator that can be used in a valve which can potentially reduce the size, weight and, ultimately, the cost of the valve. As will be more fully described below, the actuator incorporates the use of shape memory wires to take advantage of their contraction properties but at the same time avoids their short comings.

In one form of the invention, a valve includes a valve body, with a passageway forming a first port and a second port, and a valve stem located in the passageway and supported for reciprocal movement in the passageway between a first position and a second position. The passageway is open to permit fluid communication between the ports when the valve stem is moved to one of the two positions thereby opening the valve and is closed between the two ports when the valve stem is moved to the other of the two positions. The valve also includes an actuator, which selectively moves the valve stem in a direction of travel between the two positions for opening or closing the valve. The actuator includes a shape memory wire, which contracts when heated. One end of the shape memory wire is fixed relative to the valve body and another end of the shape memory wire is coupled to the valve stem in the direction of the travel of the valve stem so that when heated the contraction of the shape memory wire moves the valve stem in the direction of travel toward the second position. The actuator also includes a force generator, such as a magnetic field, which generates a magnetic force. The magnetic force acts on the valve stem and moves the valve stem in the direction of travel, and optionally independently of the shape memory wire, to the second position and seats the valve stem at the second position after the shape memory wire initially contracts to thereby open or close the valve.

In one aspect, the magnetic force reduces the load on the wire when the valve stem is moved to the second position. For example, the valve stem may be movable with respect to the memory wire in the direction of travel, wherein the magnetic force decouples the valve stem from the shape memory wire to thereby unload the wire.

In another aspect, the valve includes a first magnet mounted to the body and a second magnet mounted to the valve stem. The magnets generate the magnetic force. For example, the first magnet may comprise an annular magnet or a plurality of magnets mounted to the body about the valve stem. Similarly, the second magnet may comprise an annular magnet or a plurality of magnets mounted to the valve stem.

In another aspect, the passageway further defines a third port, which third port is in fluid communication with the second port when the valve stem is in one of the positions and is sealed from other two ports when the valve stem is moved to the other position to thereby form a 3-way valve.

In yet a further aspect, the valve includes a pair of the shape memory wires. For example, one of the shape memory wires may be configured to pull the valve stem in one direction of travel, while the other shape memory wire may be configured to pull the valve stem in the opposite direction of travel.

In yet another aspect, the shape memory wire is aligned in the direction of travel. Alternately, the shape memory wire may be angled with respect to the direction of travel wherein only a component of the contraction is aligned with the direction of travel.

According to another form of the invention, a valve includes a valve body, with a passageway that forms a first port and a second port, and a valve stem that is located in the passageway and supported for reciprocal movement in the passageway between a first position and a second position. The passageway is open to permit fluid communication between the two ports when the valve stem is moved to the first position thereby opening the valve. The passageway is closed between the two ports when the valve stem is moved to the second position whereby the valve assembly is closed. The valve also includes an actuator that selectively moves the valve stem in two directions of travel between the first and second positions and which includes a first shape memory wire and a second shape memory wire. One end of the first shape memory wire is fixed at a first location relative to the body and another end of the first shape memory wire is coupled to the valve stem in a first direction of travel of the valve stem. When heated the first shape memory wire contracts and moves the valve stem toward the first location in the first direction of travel. One end of the second shape memory wire is fixed at a second location of the body, and another end of the second shape memory wire is coupled to the valve stem in a second direction of travel. When heat is applied to the second shape memory wire, contraction of the second shape memory wire moves the valve stem toward the second location of the body in the second direction of travel opposed from the first direction of travel. The actuator further includes a magnetic field that generates a magnetic force, which acts on and moves the valve stem to the first position and seats the valve stem at the first position after the first shape memory wire initially contracts. The magnetic force also moves the valve stem to the second position and seats the valve stem at the second position after the second shape memory wire initially contracts.

In one aspect, the magnetic force reduces the load on the wires when the magnetic force moves the valve stem to the first or second position. For example, the valve stem may be movable relative to the first shape memory wire in the first direction of travel wherein the valve stem can move in the first direction of travel independently relative to the first shape memory wire. Similarly, the valve stem may movable relative to the second shape memory wire in the second direction of travel wherein the valve stem can move independently relative to the second shape memory wire. In this manner, when the magnetic force is applied to the valve stem, the magnetic force decouples the valve stem from the respective shape memory wire.

In a further aspect, the magnetic force is generated by a first magnet mounted to the body and a second magnet mounted to the valve stem.

According to another aspect, the first magnet is mounted to the body about the valve stem. The second magnet is mounted to the valve stem radially inward of the first magnet and is offset relative to the first magnet in the first direction of travel when the valve stem is moved to the first position and is offset relative to the first magnet in the second direction of travel when the valve stem is moved to the second position. In this manner, when the valve stem is in the first position, the two magnets generate a repulsion force that latches the valve stem at the first position. Similarly, when the valve stem is in the second position, the two magnets generate a repulsion force that latches the valve stem in the second position. Thus, when the first shape memory wire contracts, it must initially overcome the latching force between the two magnets to move the valve stem in the first direction of travel away from the second position toward the first position. When the second magnet moves past the first magnet in the first direction of travel it then generates the repulsion force therebetween in the first direction of travel to move the valve stem to the first position and seat the valve stem at the first position. When the second shape memory wire contracts it must initially overcome the latching force between the two magnets to move the valve stem away from the first position toward the second position in the second direction of travel. When the second magnet moves past the first magnet in the second direction of travel it then generates the repulsion force therebetween in the second direction of travel to move the valve stem to the second position and seat the valve stem at the second position.

In a further aspect, the first magnet comprises an annular magnet, and the second magnet comprises an annular magnet.

In yet another aspect, the first shape memory wire comprises a first pair of shape memory wires, and the second shape memory wire comprises a second pair of shape memory wires. For example, the first pair of shape memory wires may be arranged in a first plane, with the second pair of shape memory wires being arranged in a second plane, wherein the first plane is angled with respect to the second plane. In the illustrated embodiment, the first plane is generally orthogonal to the second plane.

In another aspect, the valve stem includes an elastomeric body for seating against the first position or the second position in the passageway.

According to yet another aspect, the shape memory wires extend through the valve stem. For example, the valve stem may include a transverse passage for each wire.

In yet another form of the invention, an actuator for selectively moving a first body in a direction of travel relative to a second body includes a shape memory wire, which contracts when heated, and a force generator, such as a magnetic field. One end of the shape memory wire is fixed to the first body. The other end of the shape memory wire is coupled to the second body in the direction of travel, which second body is movable relative to the first body. When heated, the shape memory wire contracts and pulls the second body in the direction of travel from a first position relative to the first body toward a second position relative to the first body. The force generator generates a force on the second body, which acts on and moves the second body in the direction of travel to the second position after the shape memory wire initially contracts independently of the shape memory wire to thereby reduce the load on the shape memory wire when the second body is moved to the second position.

In one aspect, the actuator further includes a first magnet mounted to the first body and a second magnet mounted to the second body, with the magnets generating the force. For example, the first magnet may comprise an annular magnet or a plurality of magnets mounted to the first body about the second body. Similarly, the second magnet may comprise an annular magnet or a plurality of magnets mounted to the second body.

In a further aspect, the first magnet is mounted to the first body about the second body, and the second magnet is mounted to the second body radially inward of the first magnet. The second magnet is offset in an opposed direction of travel relative to the first magnet when the second body is moved to the first position so as to generate a repulsion force that latches the second body in the first position. When the shape memory wire contracts and moves the second body away from the first position toward the second position, the second magnet moves past the first magnet in the first direction of travel and generates a magnetic repulsion force therebetween in the first direction of travel to move the second body to the second position.

In another aspect, the shape memory wire comprises a first shape memory wire and the direction of travel comprises a first direction of travel. The actuator further includes a second shape memory wire, with one end of the second shape memory wire fixed to the first body and another end of the second shape memory wire coupled to the second body in a second direction of travel opposite the first direction of travel such that when the second shape memory wire is heated and contracts the second shape memory wire moves the second body in the second direction of travel.

According to yet another aspect, the first shape memory wire comprises a first pair of shape memory wires arranged in a first plane, and the second shape memory wire comprises a second pair of shape memory wires arranged in a second plane, which is angled with respect to the first plane.

In yet a further aspect, the shape memory wires extend through the second body.

In yet another form of the invention, a method of moving a first part relative to a second part includes providing a shape memory wire, which contracts when heated, fixing one end of the shape memory wire to a first part, and coupling the other end of the shape memory wire to a second part, which is movable relative to the first part. The wire is heated to contract the wire to thereby apply a first pulling force on the second part and move the second part relative to the first part from a first position toward a second position in a direction of travel. A second force is generated and applies a second pulling force on the second part to move the part to the second position in the direction of and independently of the shape memory wire wherein the second force reduces the load on the shape memory wire to thereby reduce the stress on the wire.

In one aspect, the second force is generated by a magnetic field that produces a magnetic force. The second part is then pulled with the magnetic force. For example, the magnetic force may be generated by mounting a first magnet to the first part and mounting a second magnet to the second part and orienting their respective poles to generate a repulsion force between the magnets.

In yet a further aspect, a second shape memory wire is provided. One end of the second shape memory wire is fixed to a second portion of the first part, and the other end of the shape memory wire is coupled to the second part in a second direction of travel. When heated, the second shape memory wire moves the second part relative to the first part in the second direction of travel away from the second position to the first position. The second force is then applied to the second part to move the second part to the first position independently of the second shape memory wire wherein the second force reduces the load on the second shape memory wire to thereby reduce the stress on the second shape memory wire.

Accordingly, the present invention provides a valve and actuator which incorporate the use of shape memory wires in a manner to reduce the stresses in the shape memory wires while being able to take better advantage of their contraction properties than heretofore known.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
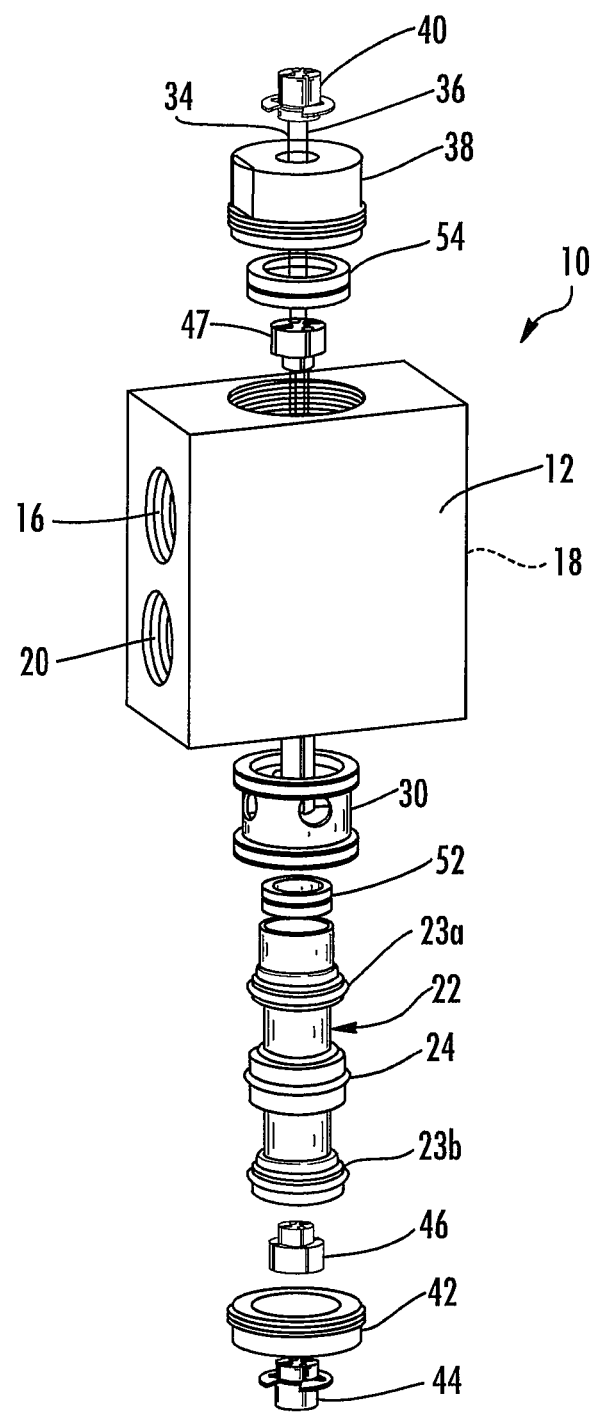
FIG. 1 is an exploded perspective view of the valve and actuator of the present invention.

Referring to FIG. 1, the numeral 10 generally designates a valve of the present invention. As will be more fully described below, valve 10 is electrically actuated by an improved actuator that incorporates the use of one or more shape memory wires to allow for a more compact valve arrangement and, further, reduces the weight of the valve, while at the same time reducing the stress in the shape memory wires. In addition, the actuator may eliminate the need for a solenoid, which reduces the weight and size as noted, and also the cost of the valve. While these advantages may be achieved with the present invention, these advantages should not be construed as limiting in any way.

Figure 2:
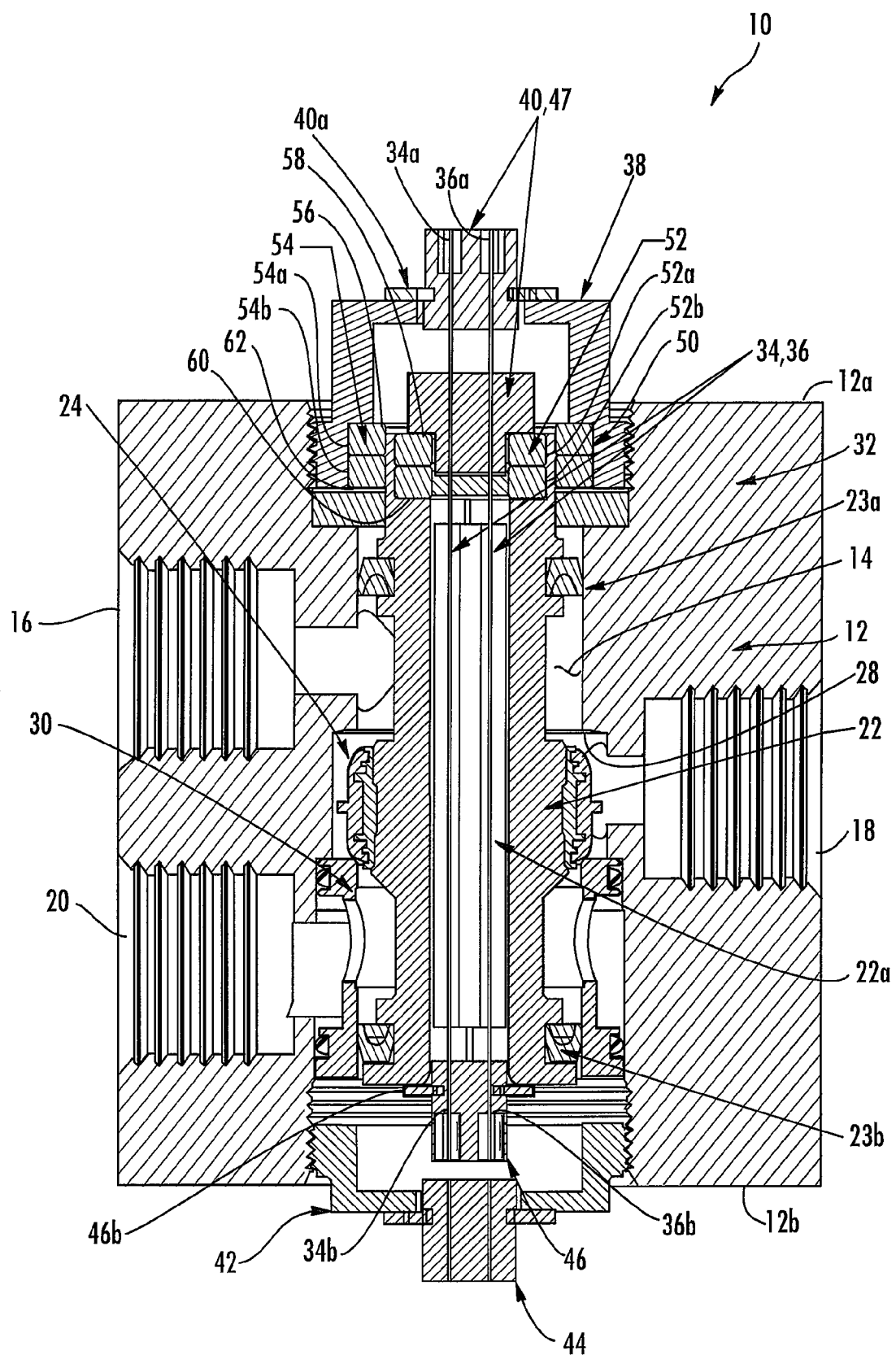
FIG. 2 is an enlarged cross-section view of the valve and actuator of FIG. 1.
Figure 3:
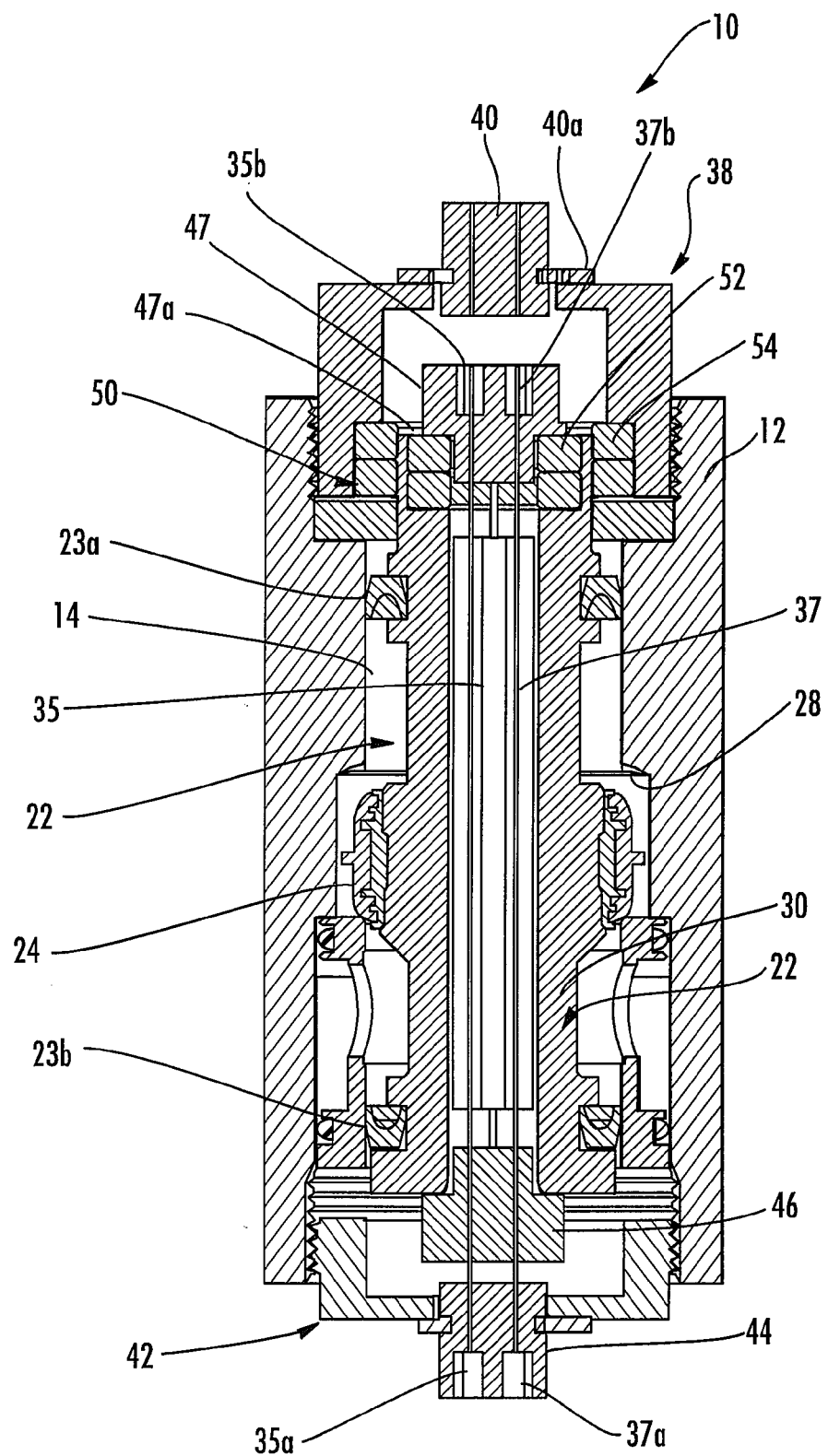
FIG. 3 is a similar cross-section view to FIG. 2 taken along a perpendicular plane to FIG. 2.
Figure 4:
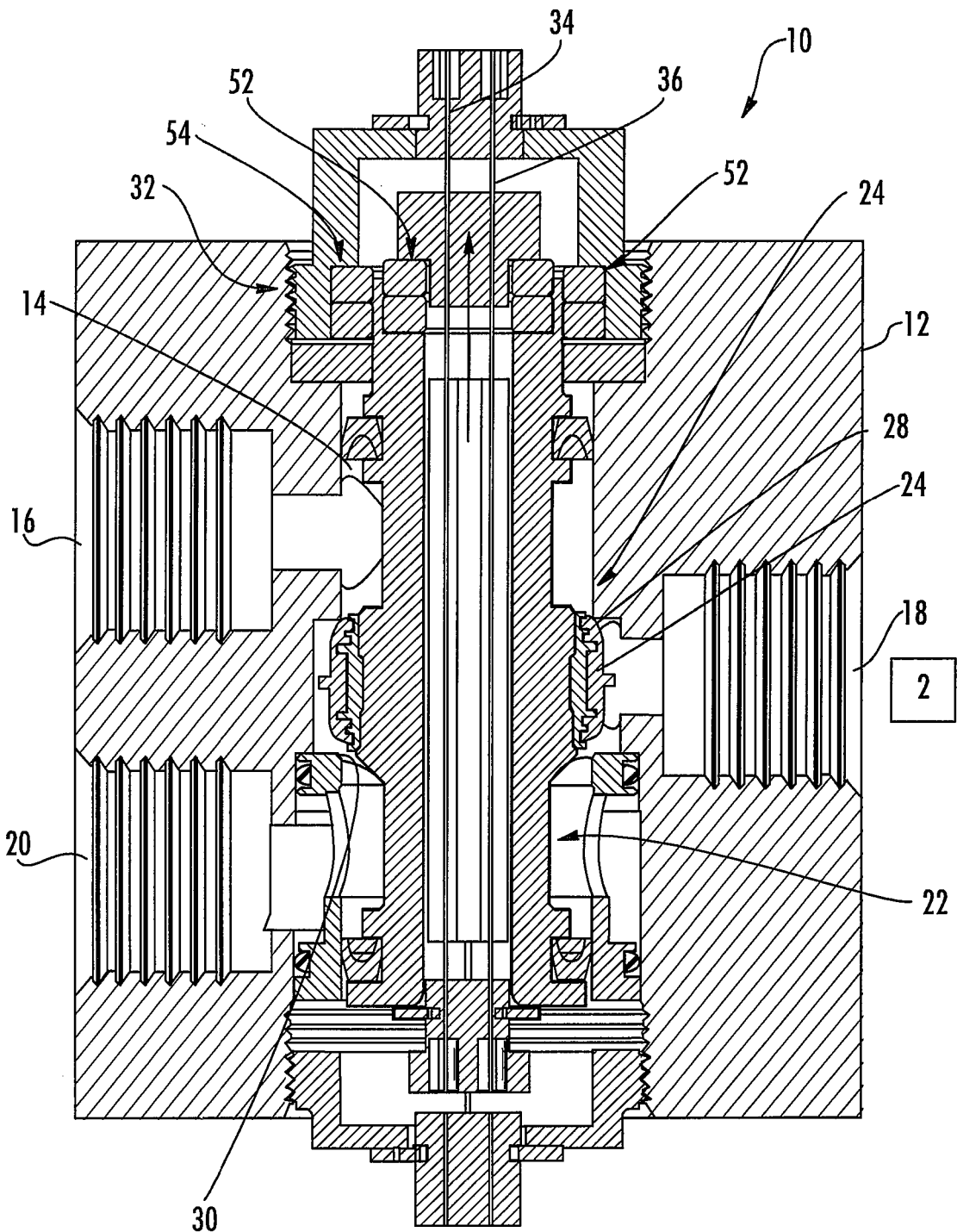
FIG. 4 is a similar view to FIG. 2 illustrating the valve in a closed state.

As best seen in FIGS. 2-3, valve 10 comprises a 3-way valve though it should be understood from the following description that the actuator may be used on a 2-way or 4-way valve or on other devices that require actuation. For example, the actuator may be used as a replacement for a solenoid or any thing that acts like a solenoid, such as a cylinder, including pneumatic or hydraulic cylinders.

Referring to FIGS. 1-5, valve 10 includes a valve body 12 with a passageway 14 that forms a first port 16, a second port 18, and a third port 20. The arrangement and locations of the ports may be varied but in the illustrated embodiment are arranged so that ports 16 and 20 are located on one side of valve body 12, while port 18 is located on another side of valve body 12. Located in passageway 14 is a valve stem 22. Valve stem 22 is supported for reciprocal movement in passageway 14 and includes a poppet 24, which is formed from an elastomeric material for sealing and closing the fluid communication between the ports to thereby open or close the valve. Stem 22 is sealed in passageway 14 by a pair of seals, such as U-cup seals 23a and 23b. As would be understood, poppet 24 may be formed from a monolithic elastomeric body or from several separate elastomeric bodies depending on the configuration of the valve.

In the illustrated embodiment, poppet 24 is formed from a single, unitary elastomeric body that is dimensioned such that when valve stem 22 is moved to a first position (shown in FIG. 4) within passageway 14 poppet 24 seals against seat 28 to seal port 16 to block fluid communication between port 16 and port 18 to thereby close valve 10. When valve stem 22 is moved to its second position (shown in FIG. 5), poppet 24 seals against seat 30 to seal and close communication between port 20 and port 18, but allow fluid communication between ports 16 and 18 to thereby open the valve.

To move valve stem 22 between its two positions, valve 10 includes an actuator 32. Actuator 32 includes two or more "memory" wires 34 and 36 and optionally two sets or pairs of shape memory wires 34, 35 and 36, 37. However, it should be understood that the number of wires and number of sets or pairs of wires may be increased or decreased. Shape memory wires are formed from a nickel titanium alloy and designed to contract when heated to a specific transition temperature and should not be extended until the temperature falls below the transition temperature. Shape memory wires are typically heated to their transition temperature by directing an electrical current through the wires and then allowed to cool below their transition temperatures by stopping the current flow through the wires. While the use of shape memory wires is well known, their application has been limited by the excessive stress levels that can be created in the wires if the wires are subject to excessive stress throughout their contraction, especially at the end of their contraction. As will be more fully described below, in the present invention the actuator maintains the stress levels in the wires at lower levels by unloading the wires during their contraction and at the end of their contraction, which, therefore, decreases the load on the wire throughout their stroke.

As best seen in FIGS. 2 and 3, shape memory wires 34, 35 and 36, 37 are fixed at their respective ends 34a, 35a and 36a, 37a relative to valve body 12, while their opposed ends 34b, 35b and 36b, 37b are coupled to valve stem 22 at least in one direction—generally in the direction of contraction. Electrical current is selectively applied to the wires to thereby heat the wires when actuation of the valve is desired, as will be more fully described below. For example, the ends of the wires may be coupled to electrical conductors, which then are routed out from the valve body for coupling to a power supply that is controlled for example by a suitable controller.

In the illustrated embodiment, ends 34a, 36a are fixed relative to body 12 by a wire anchor 38, which is threaded into one end of body 12, and a retainer 40: Retainer 40 is secured to anchor 38 by a retainer clip 40a, such as an E-shaped clip. Ends 35a and 37a are fixed to body 12 at an opposed end or location of body 12 by a second wire anchor 42, which is similarly threaded into the opposed end of body 12, and a retainer 44. The opposed ends 34b, 36b of wires 34 and 36 are then coupled to stem 22 in at least one direction—for example in their respective direction of contraction by a wire retainer 46, which is secured to end 22a of stem 22 by a retainer clip 46b, such as an E-shaped clip retainer. In the illustrated embodiment, wires 34 and 36 and 35 and 37 are generally aligned with the axis of travel of the valve stem so that there is a direct correlation between the magnitude of the wires' contraction and the distance moved by the valve stem. However, it should be appreciated that the shape memory wires may be angled to the axis of travel so that only a component of the wires' contraction will induce travel in the valve stem.

In one form, stem 22 can be decoupled from and movable relative to wires 34 and 36 in the direction of travel of valve stem 22 toward anchor 38. The opposed ends 35b, 37b of wires 35 and 37 are similarly coupled to stem 22 in the opposite direction of travel by another wire retainer 47, which is secured to the other end of stem 22 by a retainer clip 47a, such as an E-shaped clip retainer. In addition, valve stem 22 can optionally be decoupled from and movable with respect to wires 35 and 37 in the direction of travel toward anchor 42.

In this manner, one end of wires 34 and 36 is fixed relative to body 12, while the other ends of wire 34 and 36 are coupled to valve stem 22 so that when wires 34 and 36 contract, stem 22 moves toward wire retainer 40 in a first direction of travel. Similarly, one end of wires 35 and 37 is fixed relative to body 12, while the other ends of wires 35 and 37 are coupled relative to valve stem 22 so that when wires 35 and 37 contract; stem 22 moves toward wire retainer 44 in the second direction of travel opposite the first direction of travel. Further, as noted, valve stem 22 is optionally movable with respect to wires 34 and 36 in the first direction of travel toward retainer 40 and is movable with respect to wires 35 and 37 in the opposite direction of travel. As would be appreciated, when wires 34 and 36 are heated, wires 34 and 36 move stem 22 from a position shown in FIG. 3 (where poppet 24 seats against seat 30 and where poppet 24 closes fluid communication between ports 20 and 18 but allows fluid communication between ports 16 and 18 to thereby open the valves) toward another position shown in FIG. 4 (where poppet 24 seats against seat 28 to thereby close fluid communication between port 16 and port 18 to thereby close the valve). In contrast, when wires 35 and 37 contract, stem 22 moves away from seat 28 toward seat 30 to thereby close fluid communication between port 20 and port 18 but open fluid communication between port 16 and 18 to thereby open the valve. However, as will be described below, wires 34, 35 and 36, 37 do not seat the valve stem poppet at the seats. This is done instead by a force generator 50.

Figure 6:
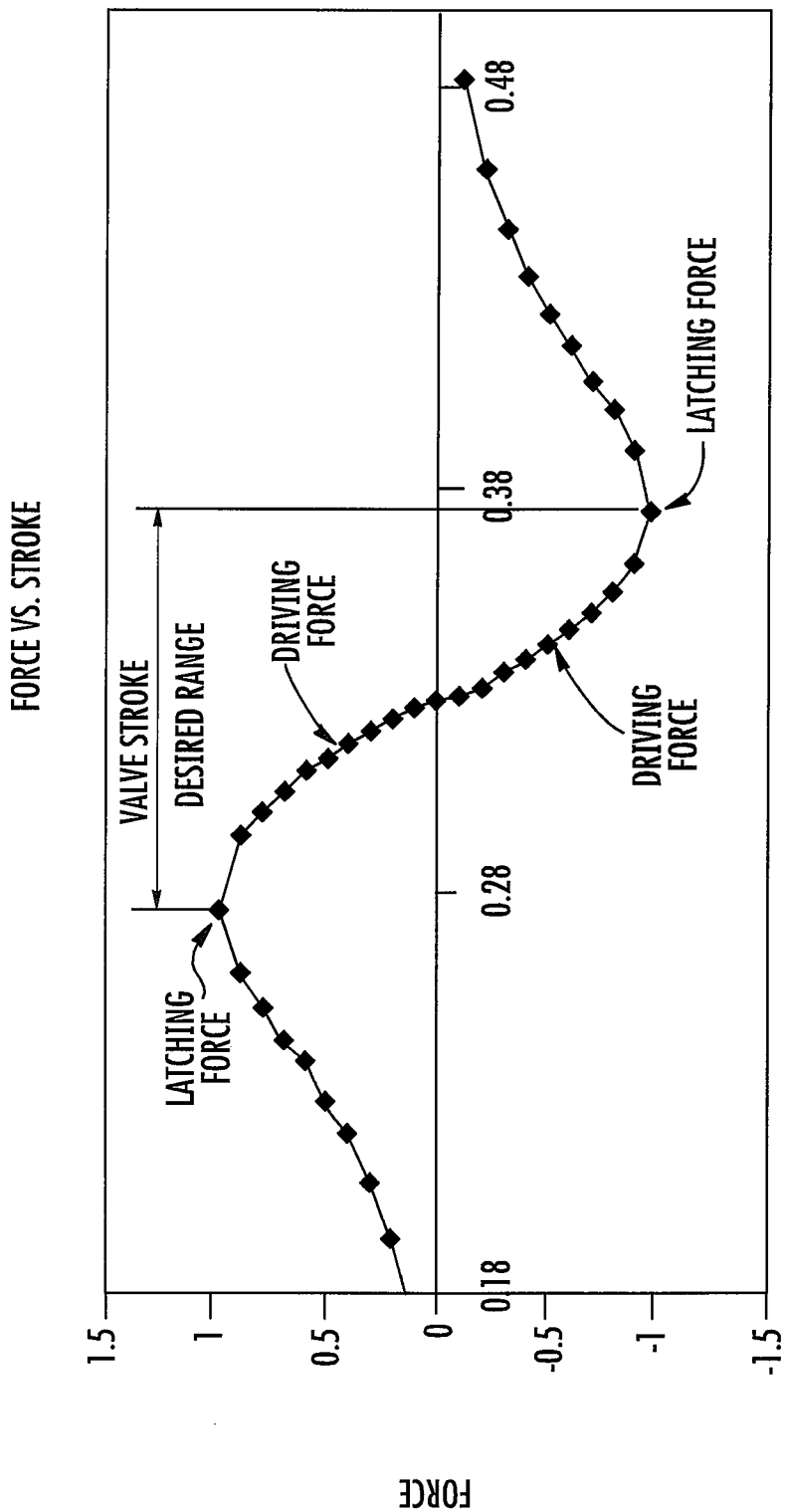
FIG. 6 is a force versus stroke diagram for the force generator of the actuator.

To reduce the force on the respective wires during each respective wire's contraction and, further, at the end or latter half of their respective contractions, actuator 32 further includes force generator 50. Force generator 50 generates latching forces to latch valve stem 22 at its respective positions where poppet 24 is seated at either seat 28 or seat 30. These latching forces are greatest when the poppet is seated at one of the seats. However, once a pulling force (i.e. when the shape wires contract) is applied to the valve stem in a direction opposed from the latching force and the valve stem moves away from its seated position against one of the seats, the latching force diminishes so that the load on the respective wires reduces. Referring to FIG. 6, the latching force is greatest at the beginning of the stroke and then decreases to zero and thereafter becomes a driving force to urge the valve stem in the direction of the respective wires' contraction. Further, as previously noted, valve stem 22 can optionally be decoupled in the direction of travel from the contracting wires so that the force generator 50 decouples the valve stem from the contracting wire and takes over and moves the valve stem to its other seated position independent of the contracting wire and further latches the valve stem in its other seated position. Even when valve stem 22 is not decoupled from the wire, the load on the contracting wire will be reduced once the latching force transitions into the driving force on the valve stem. The point at which the force generator takes over can vary, but in the illustrated embodiment the force generator 50 is configured to move the valve stem over its latter half of the stroke to thereby reduce the load on the respective wires at the end or latter half of their respective contractions.

Referring again to FIGS. 1-5, in the illustrated embodiment, force generator 50 generates a magnetic force that acts on the valve stem 22 after the respective wires initially contract to move the valve stem from its seated position at the respective seats 28 and 30. Consequently, wires 34, 35, and 36, 37 are loaded only over a portion of the valve stem's stroke. For wires 34 and 36 it is that portion of the stroke when the valve stem initially moves away from seat 30 and toward seat 28. Wires 35 and 37 are loaded over that portion of the valve stem stroke when the valve stem moves away from seat 28 toward seat 30. The magnetic force then moves the valve stem over the remaining portion of the valve stem stroke when the poppet is moved to a respective seat and then seated at the respective seat, where the magnetic forces are at their highest levels.

The magnetic force is generated by a pair of magnets 52 and 54. Magnet 52 is mounted in a fixed position relative to valve body 12. Magnet 54 is mounted in a fixed position relative to valve stem 22 such that magnet 54 is movable relative to magnet 52. In the illustrated embodiment, magnet 52 forms an outer magnet, while magnet 54 forms an inner magnet. Magnets 52 and 54 are oriented with their magnetic poles in the same direction—for example at the top 56, 58 and bottom sides 60, 62 of the magnets. Thus, the magnets generate a magnetic repulsion force between the two magnets that pushes the magnets away from each other and further in an upward or downward direction when they are vertically offset from each other (as viewed in FIGS. 2-5).

Figure 5:
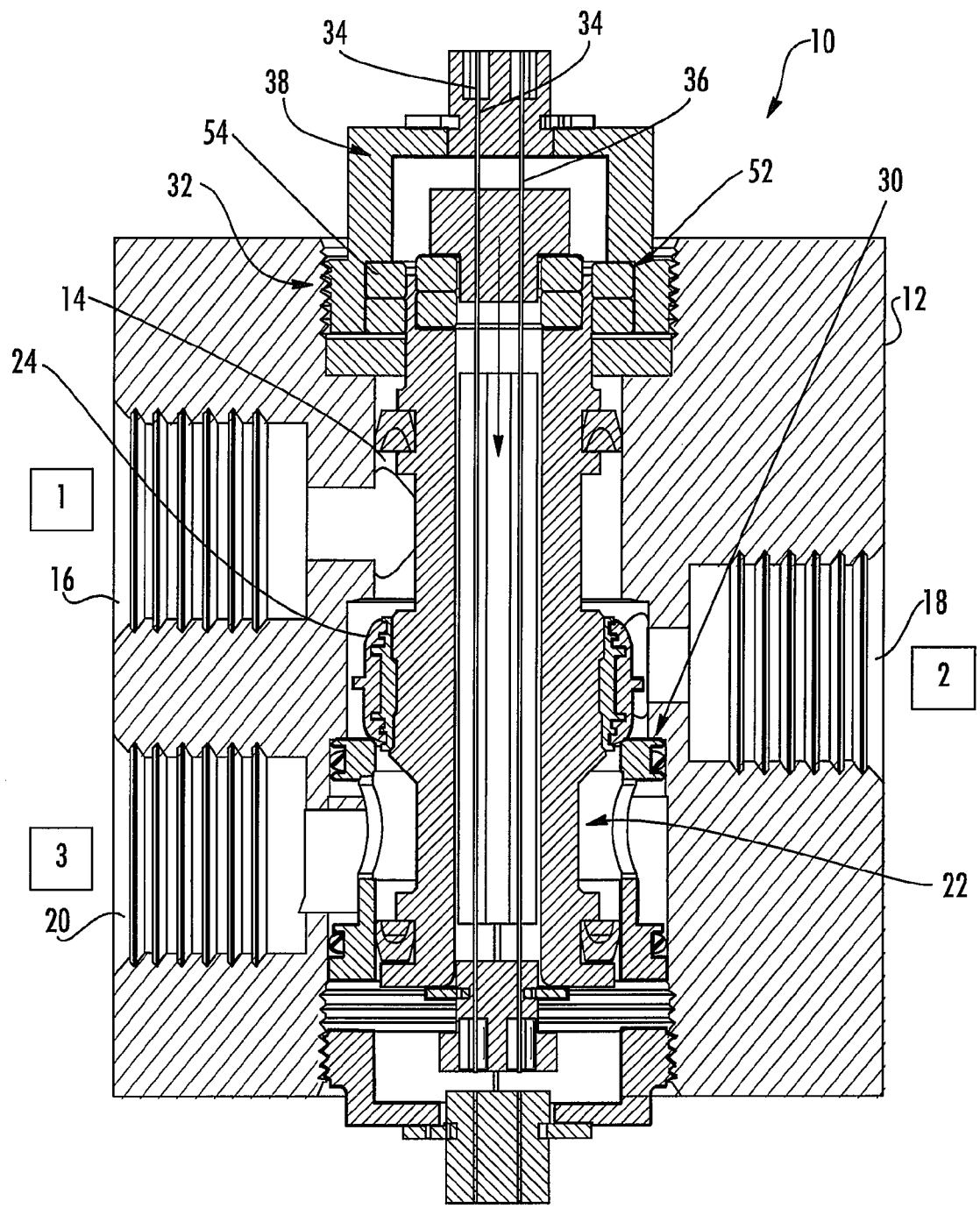
FIG. 5 is a similar cross-section to FIG. 2 illustrating the valve in an open state.

Referring to FIGS. 2 and 3, when poppet 24 is seated against seat 28 magnets 52 and 54 are arranged such that magnet 54 is above magnet 52. When poppet 24 is seated against seat 30 magnets 52 and 54 are arranged such that magnet 54 is below magnet 52. Therefore, when stem 22 is initially pulled away from its first position where poppet 24 is seated against seat 28 magnet 54 initially moves downward (as viewed in FIG. 4) relative to magnet 52 away from upper end 12a of body 12 (as viewed in FIGS. 2-5) in the downward direction of travel. The magnetic force between the magnets will initially resist this downward movement (see FIG. 4) of magnet 54 and, hence, of valve stem 22. This resistance, however, will decrease until magnets 52 and 54 are aligned, in which case the resistance becomes insignificant and over a short distance reduces to zero. As magnet 54 moves past or below the aligned position, the magnetic force will then generate a downward force urging magnet 54 in the downward direction of travel, which downward force moves valve stem 22 to its second position where poppet 24 seats against seat 30 (FIG. 5). In this valve stem configuration, magnets 52 and 54 work in a similar manner but in a reversed direction.

In the configuration shown in FIG. 5, magnets 52 and 54 initially resist upward movement of valve stem 22 in the upward direction of travel, but once magnet 54 moves above the aligned position, magnets 52 and 54 lift valve stem 22 so that poppet 24 seats against seat 28. It should be understood that the references to "above", "below", "upward" or "downward" are used are used in reference to the orientations shown in the illustrated drawings for nomenclature purposes only and, hence, are not limiting.

Wires 34 and 36 are initially contracted to overcome the downward resistive force of magnets 52 and 54 when valve stem 22 is in its lowermost position as viewed in FIG. 5—once magnet 54 is moved above the aligned position of the magnets, the magnetic force will essentially "take over" and move the valve stem to its uppermost position where poppet 24 is seated against seat 28.

Similarly, wires 35 and 37 are contracted to apply a downward force on valve stem 22 against the magnetic resistive force generated by the magnets when stem 22 is in its uppermost position with poppet 24 seated against seat 28. Once magnet 54 is moved below the aligned position of the magnets, the downward magnet force generated by the magnets effectively "takes over" and moves the valve stem 22 downward so that poppet 24 seats against seat 30. Thus, the magnets form a magnetic latch and, further, unload the wires during their contraction and, moreover, at the end of their contractions.

Referring to FIG. 6, the magnetic force generated by magnets versus the stroke of the valve stem varies depending on the strength and size of the magnets. In the illustrated embodiment, magnets 52 and 54 each comprise a pair of magnets 52*a*, 52*b* and 54*a*, 54*b*. It should be understood, therefore, the number of magnets may be increased or decreased depending on the desired stroke and force needed at the end of the stroke.

Consequently, the actuator of the present invention is able to take advantage of the contraction properties of shape memory wires while reducing the load or unloading the load on the shape memory wires during the stroke and at the end of their contraction where the wires are susceptible to failure.

While several forms of the invention have been described, other forms will now be apparent to those skilled in the art. Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

We claim:

1. An actuator for selectively moving a part relative to another part; said actuator comprising:
    a shape memory wire, said wire contracting when heated, one portion of said shape memory wire fixed to a first body, another portion of said shape memory wire coupled to a second body, said second body movable relative to said first body, when heated said shape memory wire contracts and moves said second body in a direction of travel from a first position relative to said first body toward a second position;
    a magnetic field, said magnetic field generating a magnetic force on said second body, said magnetic force acting on and moving said second body in said direction of travel to said second position after said shape memory wire initially contracts; and
    said magnetic force decoupling said second body from the force applied by said shape memory wire and moving said second body relative to said shape memory wire when applying said magnetic force to said second body to thereby unload the load on the shape memory wire when the second body is moved to said second position.

2. The actuator according to claim 1, wherein said memory wire is coupled to said second body in said direction of travel, and said second body is decoupled from said memory in said direction of travel wherein when said magnetic force is acting on said second body, said second body moves in said direction of travel and relative to and along said memory wire to thereby unload said shape memory wire.

3. The actuator according to claim 1, further comprising a first magnet mounted to said first body and a second magnet mounted to said second body, and said magnets generating said magnetic force.

4. The actuator according to claim 3, wherein said magnetic force acting on said second body to move said second body comprises a magnetic repulsion force.

5. The actuator according to claim 1, wherein said actuator comprises a pair of said shape memory wires, said shape memory wires being parallel to each other and parallel to said direction of travel wherein the longitudinal contraction of said wires is substantially equal to the longitudinal movement of the second body in said direction of travel when said wires are acting on said second body.

6. The actuator according to claim 1, wherein said shape memory wire comprises a first shape memory wire and said direction of travel comprises a first direction of travel, said actuator further comprising a second shape memory wire, said second shape memory wire contracting when heated, one portion of said second shape memory wire fixed at a second location of said first body and another portion of said second shape memory wire coupled to said second body wherein when heated said second shape memory wire contracts and moves said second body toward said second location of said body in a second direction of travel opposed from said first direction of travel.

7. The actuator according to claim 1, further in combination with a valve, said valve having a valve stem, and said actuator selectively moving said valve stem.

8. An actuator for selectively moving a part relative to another part, said actuator comprising:
    a shape memory wire, said wire contracting when heated, one portion of said shape memory wire fixed to a first body, another portion of said shape memory wire bearing on a second body, said second body movable relative to said first body and movable relative to said shape memory wire, when heated said shape memory wire contracts and moves said second body in a direction of travel from a first position relative to said first body toward a second position;
    a first magnet mounted to said first body and a second magnet mounted to said second body, said magnets generating a magnetic field, said magnetic field generating a magnetic force-acting-on and moving said second body in said direction of travel to said second position after said shape memory wire initially contracts to decouple the force applied by said shape memory wire and move said second body relative to said shape memory wire to thereby unload the shape memory wire when the second body is moved to said second position; and
    said second magnet being offset from said first magnet in a direction generally parallel to the direction of travel of said second body, and said second magnet moving past said first magnet when said second body moves in said direction of travel.

9. The actuator according to claim 8, wherein said first magnet extends around said second magnet.

10. The actuator according to claim 8, wherein said wire is parallel to said direction of travel.

11. The actuator according to claim 8, wherein said memory wire comprises a pair of memory wires.

12. The actuator according to claim 8, wherein said shape memory wire comprises a first pair of shape memory wires, and said actuator including a second pair of shape memory wires.

13. The actuator according to claim 8, further in combination with a valve, said valve having a valve stem, and said actuator selectively moving said valve stem.

14. An actuator for selectively moving a part relative to another part, said actuator comprising:
    a shape memory wire, said wire contracting when heated, one portion of said shape memory wire fixed to a first body, another portion of said shape memory wire releasably coupled to a second body, said second body movable relative to said first body, when heated and coupled to said second body said shape memory wire contracts and moves said second body in a direction of travel from a first positiOn relative to said first body toward a second position, and said direction of travel being parallel to said wire; and a magnetic field, said magnetic field generating a magnetic force, said magnetic force acting on said second body and moving said second body in said direction of travel and decoupling the force applied by said shape memory wire and moving said second body relative to said shape memory wire wherein the length of contraction of said wire induces a substantially equal longitudinal movement in said second body in said direction of travel, and said magnetic force moving said second beyond the length of contraction of said wire.

15. The actuator according to claim 14, further comprising a first magnet mounted to said first body and a second magnet mounted to said second body, said magnets providing said magnetic field.

16. The actuator according to claim 15, wherein said shape memory wire comprises a first shape memory wire and said direction of travel comprises a first direction of travel, said actuator further comprising a second shape memory wire, said second shape memory wire contracting when heated, one portion of said second shape memory wire fixed at a second location of said first body and another portion of said second shape memory wire coupled to said second body wherein when heated said second shape memory wire contracts and moves said second body toward said second location of said body in a second direction of travel opposed from said first direction of travel.

17. The actuator according to claim 14, further in combination with a valve, said valve having a valve stem, and said actuator selectively moving said valve stem.

18. The actuator according to claim 17, wherein said memory wire extends through said valve stem.

19. The actuator according to claim 17, wherein said valve comprises a three-way valve.

* * * * *

UNITED STATES PATENT AND TRADEMARK OFFICE
CERTIFICATE OF CORRECTION

PATENT NO. : 8,528,597 B2
APPLICATION NO. : 12/268768
DATED : September 10, 2013
INVENTOR(S) : Mark William Freedman and Robert Brian Knepple It is certified that error appears in the above-identified patent and that said Letters Patent is hereby corrected as shown below:

In the Claims

Column 11
Claim 14, Line 2, "positiOn" should be --position--

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,528,597 B2  
APPLICATION NO. : 12/268768  
DATED : September 10, 2013  
INVENTOR(S) : Mark William Friedman and Robert Brian Knepple Page 1 of 1

It is certified that error appears in the above-identified patent and that said Letters Patent is hereby corrected as shown below:

In the Claims

Column 11
Claim 14, Line 2, "positiOn" should be --position--

This certificate supersedes the Certificate of Correction issued November 11, 2014.

Signed and Sealed this
Ninth Day of December, 2014

Michelle K. Lee
*Deputy Director of the United States Patent and Trademark Office*